(No Model.)　　　　　　　　　　　　　　　　　　2 Sheets—Sheet 1.
W. MALAM.
CAR WHEEL AND AXLE.

No. 347,119.　　　　　　　　　　Patented Aug. 10, 1886.

Witnesses:
John E. Parker
Hamilton D. Turner

Inventor:
William Malam
by his Attorneys
Howson & Sons (No Model.) 2 Sheets—Sheet 2.
W. MALAM.
CAR WHEEL AND AXLE.
No. 347,119. Patented Aug. 10, 1886.
FIG. 5. FIG. 6.
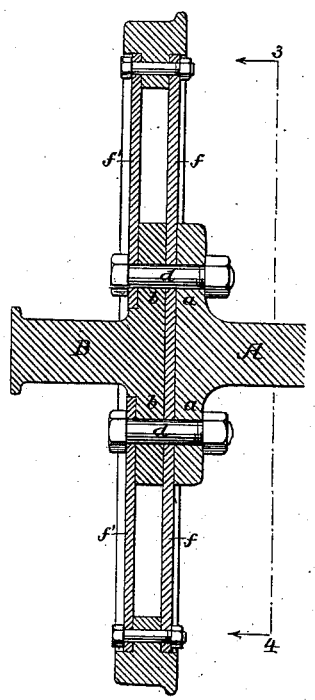
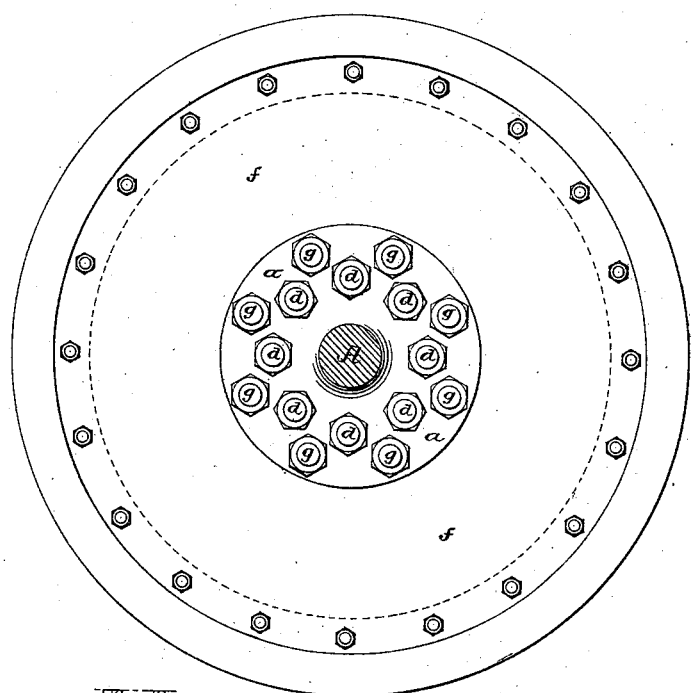
FIG. 7.
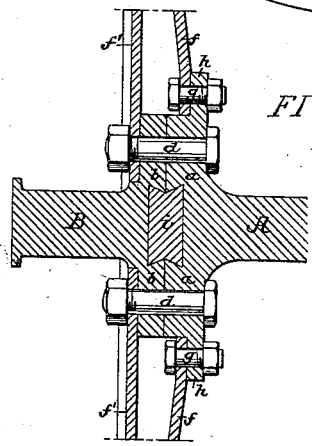
Witnesses:
John E. Parker
Hamilton D. Turner
Inventor:
William Malam
by his Attorneys
Howson & Sons

United States Patent Office.

WILLIAM MALAM, OF EDGEMOOR, DELAWARE.

CAR WHEEL AND AXLE.

SPECIFICATION forming part of Letters Patent No. 347,119, dated August 10, 1886.

Application filed January 18, 1886. Serial No. 188,918. (No model.)

*To all whom it may concern:*

Be it known that I, WILLIAM MALAM, a subject of the Queen of Great Britain and Ireland, residing at Edgemoor, Delaware, have invented certain Improvements in Car Wheels and Axles, of which the following is a specification.

My invention consists of certain improvements in the construction and application of detachable journals for railroad-car axles, one of the features of my invention being the use of such detachable journals in connection with the combined wheel and axle for which Letters Patent of the United States No. 329,180 were granted to me on the 27th day of October, 1885.

Figure 1:
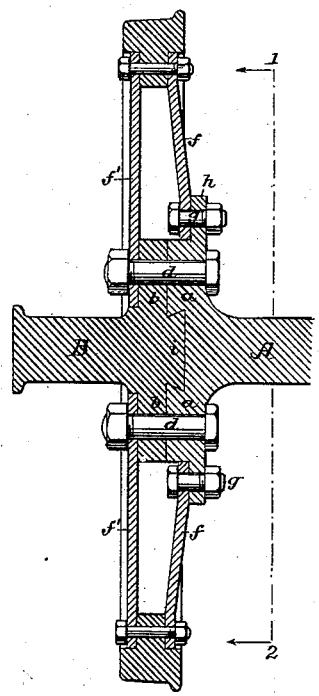
Figure 2:
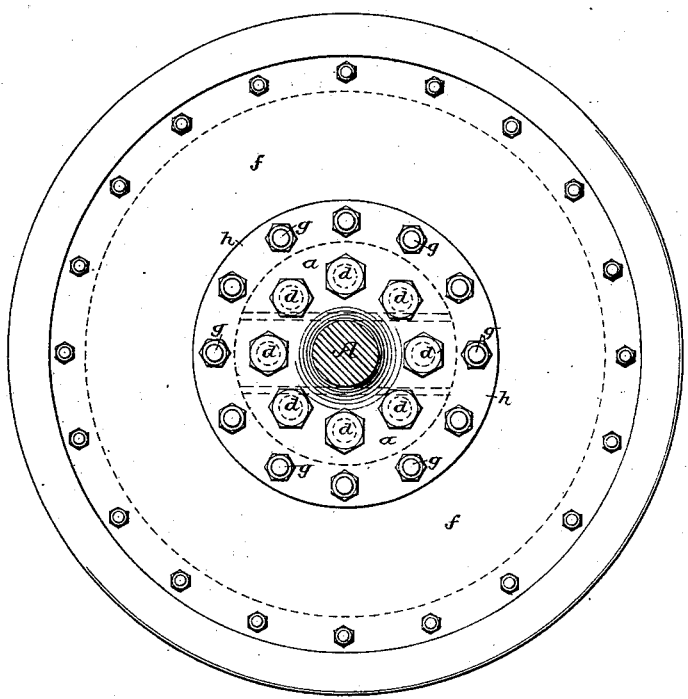
Figures 3, 4:
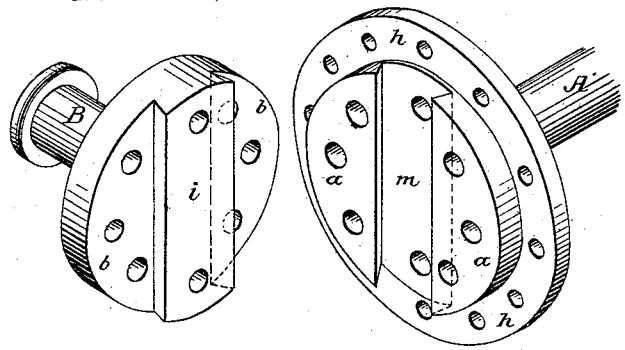

In the accompanying drawings, Figure 1 is a longitudinal section of a car-wheel and part of one end of the axle constructed in accordance with my invention; Fig. 2, a section on line 1 2, looking in the direction of the arrows, Fig. 1; Fig. 3, a perspective view of the journal detached from the axle; Fig. 4, a perspective view of the end of the axle to which the journal is to be applied; Fig. 5, a longitudinal section of a car-wheel and part of the axle, showing my invention in a modified form; Fig. 6, a section of Fig. 5 on the line 3 4, looking in the direction of the arrows; and Fig. 7, a view showing a further modification of my invention.

The main feature of the invention set forth in my patent above alluded to was the combination of the body plate or plates of a car-wheel with an axle having a wheel-hub formed integral therewith and presenting a seat or seats to which the body of the wheel was bolted.

In the axle shown in my former patent the journal formed part of the axle; but it is advisable in many cases to make the journal independent of and detachable from the body of the axle, so that it can be removed when worn or otherwise defective and replaced by a new one without discarding the entire axle. For this reason, in constructing my present axle, I provide the body A of the same with a flange, *a*, and construct the journal B with a corresponding flange, *b*, which is secured to the flange *a* by bolts *d*, which also serve to secure a plate or plates of the wheel-body.

As shown in Fig. 1, the wheel-body consists of two plates, *f f'*, the inner plate being secured by bolts *g* to a flange, *h*, projecting beyond the flange *a* of the axle, and the outer plate, *f'*, being secured to the outer face of the flange *b* of the journal by means of the bolts *d*, which pass through said plate and through both flanges *a* and *b*. In order to assist these bolts in resisting the lateral and torsional strains to which the journal is subjected, I provide the inner face of the flange *b* with a dovetailed rib or projection, *i*, which is adapted to a similarly-dovetailed recess, *m*, in the outer face of the flange *a* of the axle-body, and thus forms a key, the construction of these parts being fully shown in Figs. 3 and 4. The arrangement of rib and recess may, if desired, be reversed— that is to say, the rib may be formed on the flange *a* and the recess in the flange *b*; or a separate key, adapted to recesses in both flanges, may be used, as shown in Fig. 7, and where torsional strains only are to be resisted by the key the latter need not be dovetailed or undercut. The construction of the wheel may also be modified in other respects without departing from the main feature of my invention. For instance, in Figs. 5 and 6 I have shown a wheel and axle in which the key is dispensed with, and in which the inner plate, *f*, of the wheel-body is in the form of a disk, the central portion of which is clamped between the flanges *a* and *b*, the outer plate, *f'*, being clamped to the outer face of said flange *b*, and both sets of securing-bolts *d* and *g* passing through both plates and both flanges.

I do not desire to claim, broadly, an axle having a detachable journal, as this in itself is not new; but

I claim as my invention—

1. The combination of the body portion of the axle and the detachable journal, both having flanges which unite to form a wheel-hub, inner and outer plates constituting a wheel-body, and bolts whereby said plates are secured to the wheel-hub, some or all of the said bolts also serving to secure together the flanges forming said hub, all substantially as specified.

2. The combination of the body portion of the axle having a flange, *a*, with outer projecting flange, *h*, a detachable journal having a flange, *b*, the plates *f f'* of the wheel-body, bolts $g$, whereby the inner plate, $f$, is secured to the flange $h$, and bolts $d$, whereby the outer plate, $f'$, is secured to the flange $b$ and said flanges $a$ and $b$ are secured together, all substantially as specified.

3. A railroad-car axle in which a flanged body portion and a flanged and detachable journal are combined with securing-bolts and with an undercut key which aids said bolts in preventing longitudinal separation of the journal from the axle-body, all substantially as specified.

4. A railroad-car axle in which are combined a flanged body portion, a flanged and detachable journal, and securing-bolts, one of said flanges having a projecting key adapted to a recess in the face of the other flange, all substantially as specified.

In testimony whereof I have signed my name to this specification in the presence of two subscribing witnesses.

WILLIAM MALAM.

Witnesses:
JOHN E. PARKER,
HARRY SMITH.